United States Patent [19]
Gonzales, Jr. et al.

[11] Patent Number: 5,337,715
[45] Date of Patent: Aug. 16, 1994

[54] ENGINE DECELERATION INTAKE AIR FLOW REDUCTION AND FUEL SHUT-OFF CONTROL

[75] Inventors: Frank Gonzales, Jr., Westland; Timothy J. Mortimer, Ann Arbor, both of Mich.

[73] Assignee: Ford Motor Company, Dearborn, Mich.

[21] Appl. No.: 976,011

[22] Filed: Nov. 13, 1992

[51] Int. Cl.$^5$ .................. F02D 33/00; F02M 23/00
[52] U.S. Cl. ............................ 123/325; 123/327
[58] Field of Search .................. 123/325, 327, 493

[56] References Cited

U.S. PATENT DOCUMENTS

| | | | |
|---|---|---|---|
| 2,064,579 | 12/1936 | Werner | 192/0.062 |
| 2,886,020 | 5/1959 | Wolfe | 123/585 |
| 3,349,644 | 10/1967 | Gish | 74/860 |
| 3,374,991 | 3/1968 | Walker | 261/41.5 |
| 3,486,594 | 12/1969 | Wren, Jr. | 192/0.062 |
| 3,817,229 | 6/1974 | Stumpp | 123/332 |
| 3,906,909 | 9/1975 | Garcea | 123/324 |
| 3,948,116 | 4/1976 | van Pelt | 74/482 |
| 4,343,002 | 1/1981 | Freyer et al. | 123/325 |
| 4,437,442 | 3/1984 | Yamaguchi | 123/417 |

*Primary Examiner*—Tony M. Argenbright
*Attorney, Agent, or Firm*—Jerome R. Drouillard; Roger L. May

[57] ABSTRACT

In an automotive type engine having an air bypass valve controlling a portion of the air flow to the engine, decelerations are controlled in a manner to minimize or eliminate the conventional large feedback negative torque impulse to the operator usually experienced when fuel is shut off. The air bypass valve is closed down, in response to correct decel conditions, to an air flow level below that scheduled to establish the normal idle speed condition. The positive engine combustion torque is decreased so that the magnitude of the ratio between it and the engine negative torque becomes small. Immediately following fuel shut-off, the bypass valve is re-opened to return the air flow to that level establishing the set idle speed condition upon resumption of fuel flow.

5 Claims, 1 Drawing Sheet

ENGINE DECELERATION INTAKE AIR FLOW REDUCTION AND FUEL SHUT-OFF CONTROL

FIELD OF THE INVENTION

This invention relates in general to an automotive type engine. More particularly, it relates to a control for reducing engine intake air flow rate, and terminating fuel during engine decelerations without a noticeable effect to the vehicle operator.

BACKGROUND OF THE INVENTION

For increased fuel economy and lower exhaust emissions, it is common for automotive type engines to shut off the fuel during certain engine decelerations. The fuel shut-off occurs at an rpm higher than the normal engine idle speed. This sudden termination of positive engine combustion torque during deceleration results in an abrupt increase in the negative net engine torque which includes negative torques due to engine and vehicle friction, pumping losses, etc., so that a decided bump, or abrupt increase in vehicle deceleration may be experienced by the operator. The fuel shut-off is usually computer controlled to be operative as soon as it recognizes that the engine is in a closed throttle mode and that the vehicle speed, engine rpm and/or other conditions are right. The fuel shut-off, therefore, may occur at a point when the air mass flow rate through the idle speed control throttle bypass air valve is considerably greater than that required to establish the desired idle speed.

More specifically, where a throttle bypass air valve is included to control bypass air around the closed throttle valve, during normal open-throttle engine operation the bypass valve is typically controlled to allow an air mass flow rate that is larger than the rate required to maintain normal engine idle operation. The conventional closed throttle deceleration operation usually places the bypass valve in a dashpot action to smoothly decrease air mass flow rate to the engine to normally prevent stalling or unacceptable engine transient behavior. As a result, the fuel shut-off usually occurs at a point when the air mass flow rate is greater than the idle speed air mass flow rate. In particular, when fuel shut-off occurs, the air mass flow rate is never less than the rate required to maintain normal engine idle operation.

This invention provides a control operable during engine decelerations in response to predetermined operating conditions to delay the fuel shut-off until the total air mass flow rate to the engine is decreased below that level normally required to establish the engine idling speed, and immediately returned to the normal engine idle speed air mass flow rate following fuel shut-off, to provide a smooth engine deceleration without the conventional "bump" or abrupt increase in vehicle deceleration referred to above, and also to permit the normal idle speed condition to be reestablished upon subsequent restoration of fuel flow.

DESCRIPTION OF THE PRIOR ART

The prior art in general shows air throttle bodies with fuel shut-off strategies operable during decelerations, for economy and other reasons. Some also show air bypass valves operable during closed engine throttle valve operations, to supply air to the engine that is sufficient to maintain normal operation at idle speeds.

U.S. Pat. No. 4,243,002 to Freyer et al. describes an engine deceleration fuel cut-off system for a mechanical fuel injection system having a throttle valve 2 controlled air induction passage 10 with an air bypass duct 50 with a valve that closes the duct. In this case, the air bypass valve either is opened or closed; there is no intermediate position or metered position apparent. The air bypass valve closes when the throttle valve closes, and is closed by atmospheric air pressure controlled by a solenoid. Current to the solenoid is supplied or controlled by four switches when the engine rpm is above idle speed and the throttle valve is closed, the clutch engaged, and the transmission engaged. There is no control of gradual reduction of air mass flow rate to a point below normal idle speed air mass flow rate prior to fuel cut-off.

U.S. Pat. No. 4,437,442 to Yamaguchi describes an engine deceleration control system in which retarded spark timing is used during a delay in the cutoff of fuel to reduce the shock to the operator by gradually reducing the engine torque to zero, rather than abruptly. A microprocessor cuts off the fuel pulse signal when a throttle valve is closed for a predetermined minimum time and the engine speed is greater than a scheduled value and the transmission in top speed range. In this case, the spark timing is retarded beyond the optimum to reduce torque, and does it gradually or smoothly in stepwise manner to obtain a smoother torque reduction to minimize the shock to the operator.

U.S. Pat. No. 4,415,124 to Hayashi describes an engine deceleration control system whereby engine speed is lowered but fuel is not cut off when in the decel mode with certain other engine parameters satisfied. Hayashi, in FIG. 4, describes an electronically controlled fuel injection system for use with an automatic transmission and shows a pair of air bypass passages controlled by a pair of metering rods 86 and 88. However, the air bypass passages are controlled primarily to provide an engine idle speed that would correspond to that which would be obtained when a manual transmission is used, rather than the automatic transmission proposed. No mention is made of controlling the air mass flow rate to decay the same to a level below that normally providing a normal engine speed prior to engine fuel cut-off during deceleration.

SUMMARY OF THE INVENTION

The overall-strategy of the invention is to provide engine decelerations in a smooth manner that will essentially eliminate or minimize the conventional shock, bump, or abrupt increase in vehicle deceleration experienced by the operator when the fuel is shut off to provide better economy and lower emissions. It accomplishes this by reducing the total air mass flow rate to the engine to below the level that would normally establish the set engine idle speed, and then returning the air mass flow rate to the idle speed level immediately after the fuel is shut off. The result is a reduction of the engine combustion torque to a point where the magnitude of the positive combustion torque relative to the magnitude of the negative total net engine torque is so small that termination of the fuel flow and positive combustion torque provides only a minimum increase in vehicle deceleration and minimal, if any, feedback to the operator.

The air throttle body in this case contains an air bypass passage connecting opposite portions of the induction passage around the throttle valve in its closed position to provide sufficient total air flow to the engine to prevent stalling, etc. during normal engine idling conditions. The bypass passage is provided with a variably movable valve to variably control the opening and closing of the passage to also track the movement of the throttle valve during open-throttle engine operation and thereby meter the volume of air flow and provide the desired objective.

When the vehicle operator releases the throttle valve to its idle speed position, i.e., the closed throttle position, and the engine is in a deceleration mode, signals are received by a microprocessor/computer indicating such a condition, and if other engine operating parameters are correct to provide for a scheduled decel fuel shutoff deceleration, the bypass valve will move smoothly to reduce the bypass air passage to an air mass flow rate lower than that which normally would be called for to establish an engine idle speed condition but still sufficient to maintain engine operation.

The engine positive combustion torque, therefore, slowly decreases to below the normal idle speed level, and thus the conventional torque feedback bump is minimized when the fuel is then shut off. Immediately thereafter, the bypass valve again is moved open in response to a signal from the microprocessor to establish the idle speed air mass flow rate so that upon resumption of the fuel flow, the engine will again resume a normal idle speed condition.

It is a primary object of the invention, therefore, to provide an engine deceleration fuel shut-off and air flow control that will effect a termination of the fuel flow during engine decelerations, for economy, while at the same time provide a smooth deceleration followed by a resumption of the normal set engine idle speed operation when fuel flow again is resumed.

It is a further object of the invention to provide an engine deceleration control as described above in which the engine air flow and load are smoothly controlled during decelerations to essentially eliminate the conventional feedback bump or abrupt increase in vehicle deceleration experienced by the vehicle operator upon fuel shut-off during this mode of operation.

Other objects, features, and advantages of the invention will become more apparent upon reference to the succeeding, detailed description thereof and to the drawing illustrating the preferred embodiment thereof, wherein:

BRIEF DESCRIPTION OF THE DRAWINGS

The single sheet of drawing contains a single figure that is a cross-sectional view of an engine air throttle body operatively connected to a schematically illustrated control system embodying the invention.

DESCRIPTION OF THE PREFERRED EMBODIMENT

Figure 1:
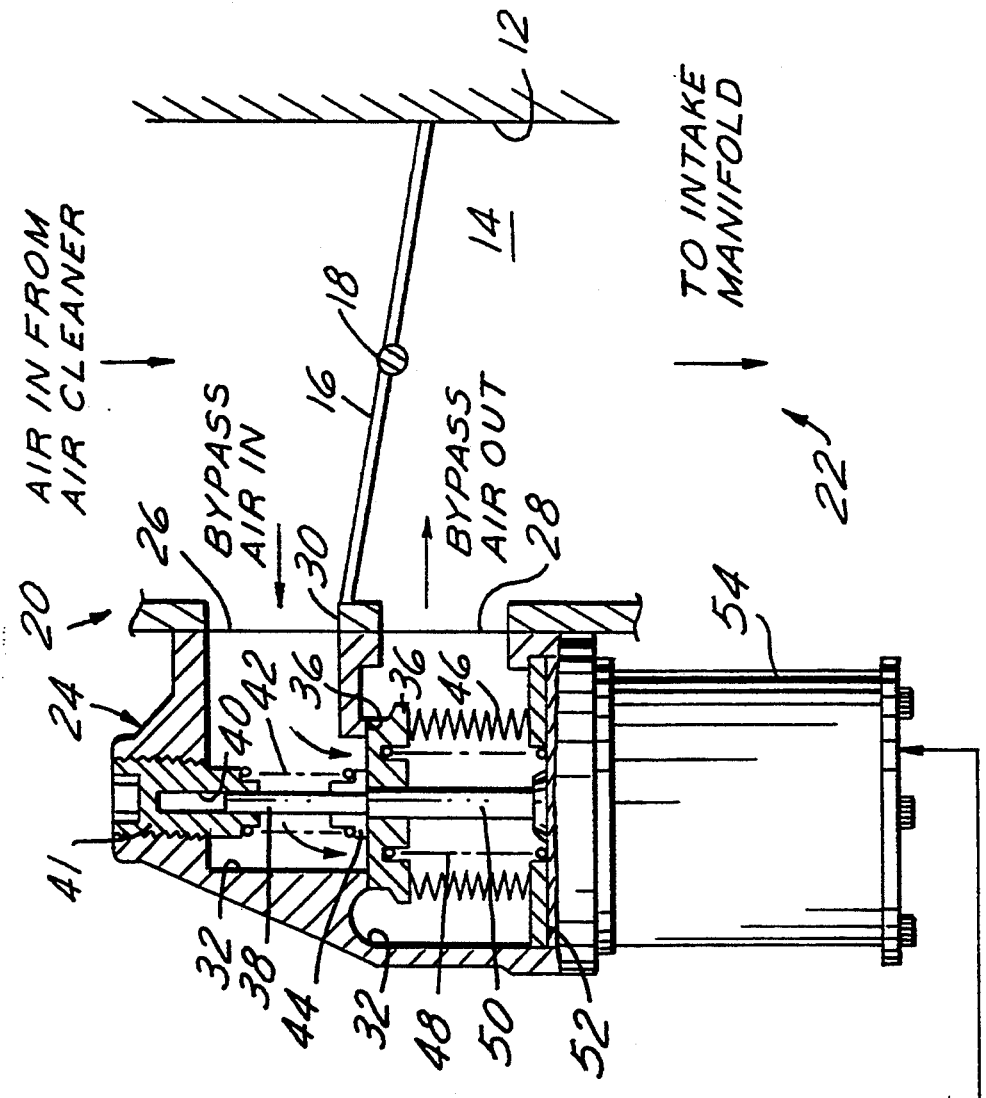
Figure 1:
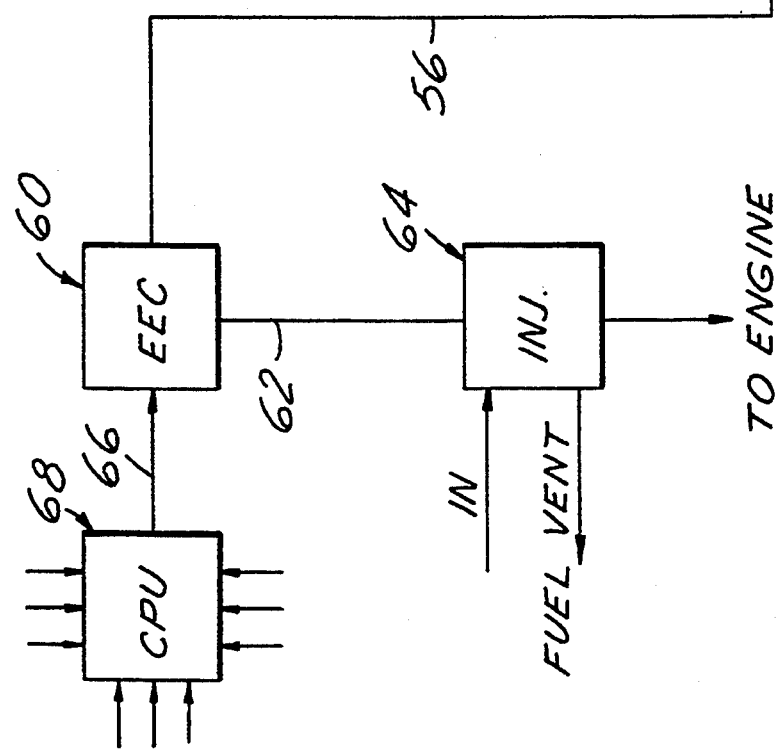

The right-hand portion of the figure shows a portion 10 of an air throttle body adapted to be connected to a conventional automotive type internal combustion engine. More particularly, the throttle body has a longitudinal bore 12 defining an induction passage 14. A butterfly type throttle plate 16 is mounted on a shaft 18 pivotally mounted in the walls of the throttle body 10 so as to be rotatable between the fully closed position shown to a nearly vertical, wide-open position.

The upper end 20 of the induction passage is adapted to be connected to the conventional engine air cleaner to receive clean air therefrom, the lower end 22 being adapted to be connected to the engine intake manifold in a known manner to direct the air into the engine combustion chambers. Fuel is injected into the air and mixes with it, before the air enters the combustion chambers.

Attached to the side of the air throttle body, by means not shown, is an air bypass housing 24. It has a pair of essentially circular openings, an air inlet 26 and an outlet 28, separated by a divider or partition 30. A central stepped diameter chamber 32 interconnects the inlet and outlet to permit bypass air from the throttle body to flow around the closed position of throttle plate 16 indicated in full lines to continue to supply air flow to the engine to maintain its operation, when desired.

An essentially circular flat air bypass valve 34 is adapted to seat against the edge 36 defining the smaller diameter chamber to control the passage of bypass air from passage 26 to passage 28. More particularly, the bypass valve has a guide rod 38 adapted to slide in the recess 40 provided in an insert 41 to the bypass housing. A spring 42 seated between the insert and a seat 44 attached to valve 34 normally biases the bypass valve towards an open position. A further pair of springs 46 and 48 are placed in opposition to the spring 42 and urge the bypass valve 34 closed. The guide rod 38 is also of a stepped diameter, the lower portion 50 extending below the valve 34 and being attached to the armature 52 of an electronically controlled solenoid indicated in general at 54. Operation of the solenoid controls the movement of bypass valve 34 in a variable manner to open or close the interconnection between inlet port 26 and outlet port 28, in a manner to be described.

Considering the remaining portion of the figure, the solenoid is wired by a line 56 to an engine electronic control module indicated in general by the EEC block 60. The EEC module controls fuel flow to the engine by means of output signals through lines 62 to fuel injectors indicated in general at 64. The latter has a fuel inlet and return as indicated and a fuel output flow to the engine at a rate as dictated by the EEC module according to a design schedule, as well as desired engine operating conditions.

The EEC module in turn receives an input signal through a line 66 from a micro-controller (CPU) indicated in general by the block 68. The CPU has a number of input signals indicated by the arrows indicative of various engine operating conditions. For example, vehicle speed, engine speed, desired engine speed, engine coolant temperature, throttle valve position, bypass valve position, engine load, engine intake air mass flow rate, and transmission mode, among others. The chip contained within the CPU would then analyze the inputs and compare them with design schedules to program the correct amount of fuel to each engine combustion chamber in accordance with the demand called for by the vehicle operator and the condition of the vehicle and engine, including engine intake air mass flow rate.

As stated previously, this invention is directed towards controlling the operation of the engine during engine closed-throttle decelerations under certain operating conditions to eliminate or minimize a negative feedback torque pulse to the vehicle operator as a result of a fuel cut-off during the decel mode when the air mass flow rate to the engine is at or above the idle speed air flow rate. Normally, when this occurs, the magnitude of the terminated positive combustion torque is large compared to the magnitude of the negative torque that is a result of engine and vehicle friction, engine and vehicle wind resistances, pumping losses, etc. In the above case, when the CPU receives signals that the vehicle operator has released the throttle valve to its closed position, i.e., the engine idle position, and if the engine rpm is above a predetermined value, then if other conditions are satisfied, such as the vehicle speed is correct, the transmission mode correct, the engine coolant temperature within a certain range, etc., the CPU then will be in a condition to schedule a decel fuel shutoff mode of operation.

Under this condition, an output signal will be sent through line 66 to the EEC module 60 which in turn will send current to solenoid 54 of such a magnitude as to smoothly close down the air bypass valve 34 to restrict the total air flow to the engine at this time prior to fuel shut-off.

Under normal non-fuel shut-off decelerating throttle closing operation, the engine operating conditions would not be correct to terminate fuel flow, such as the engine rpm being below a predetermined value or the vehicle speed not correct, etc. Under these conditions, the CPU unit would send a signal to the EEC module to provide a current to solenoid 54 that would provide a conventional slow dashpot closing action to the bypass valve 34 to reduce the air bypass passage so as not to cause the engine to stall and to allow normal engine idle operation.

However, when the engine operating conditions are correct for terminating fuel delivery during closed-throttle deceleration, a smooth closing movement of the bypass valve 34 reduces the total air mass flow rate available to the engine to a level below that which normally would be required to establish the set normal engine idle speed of the engine. The lower level, however, is still sufficient to maintain engine operation to continue to produce a non-zero positive engine combustion torque.

Since load is a function of total air mass flow rate, lowering this flow rate causes a low load and low positive combustion torque. The reduced air mass flow rate would be below that required to establish the set idle speed level. Once that lower load level is reached, the EEC module would then cause the fuel to injectors 64 to be shut off and cause positive combustion torque to cease. However, just prior to termination of fuel delivery, the combustion torque would be at a low value, and the magnitude of it relative to the magnitude of the negative net engine torque would be small, thereby essentially eliminating the bump or feedback to the operator upon elimination of the combustion torque.

Moreover, the above-described action of the air bypass valve actually increases the magnitude of the negative torque due to engine pumping losses, and thereby increases the magnitude of the negative net engine torque. This renders the magnitude of the engine's positive combustion torque an even smaller value relative to the magnitude of the net negative engine torque.

The fuel shutoff is sensed by the CPU, which immediately causes a current flow to solenoid 54 to reopen the bypass valve to increase the air mass flow rate from the decel mode level back to the level scheduled to provide the set idle speed condition of the engine. Thereafter, reestablishment of fuel flow by a signal from the EEC module in response to detection of operator demand for acceleration or detection of engine speed approaching the normal idle speed, would condition the engine for a normal idle speed operation insofar as air mass flow rate is concerned.

In summary, therefore, it will be seen that the engine operates in a normal manner when the vehicle is cruising along, for example, with a partially or fully opened throttle valve, and engine and vehicle speeds, etc. being at the correct level. A release of the throttle valve at this time may not trigger the CPU to condition the vehicle for a decel fuel shut-off operation since the various engine parameters may not have been met.

Assume, for example, that a fuel shut-off decel mode is not operative; then, upon throttle valve closing, solenoid 54 will move bypass valve 34 to decrease air flow. When a position is reached at which the total air mass flow rate to the engine is the amount required to maintain the engine at its normal engine idle speed condition, then the CPU will control the current to the solenoid so that the dashpot action will be completed.

Upon subsequent reopening of the throttle, solenoid 54 will receive a current of a magnitude to cause bypass valve 34 to track the position of the throttle plate, at relative opened positions similar to the relative opened positions of the throttle valve, to supply additional air flow around the throttle plate and induction passage in proportion to the air flow rate past the throttle plate. When the closed-throttle decel fuel shutoff mode becomes operative, i.e., the engine operating conditions are correct, then, as stated previously, solenoid 54, upon closing of throttle plate 16, will smoothly close down the bypass valve 44 to the position restricting air mass flow rate to a level below the engine idle speed level. The fuel is then shut off. Immediately thereafter, solenoid 54 moves the bypass valve 34 increasing the air mass flow rate back to the set engine idle speed level so that such an engine speed can be obtained upon resumption of fuel flow to the engine.

From the above, it will be seen that the invention as shown and described provides a deceleration control that essentially eliminates or minimizes the normal or conventional abrupt increase in negative net torque that produces an impulse shock or bump felt by the vehicle operator when the normal fuel cut-off decel condition is operative.

While the invention has been shown and described in its preferred embodiment in the drawing, it will be clear to those skilled in the arts to which it pertains that many changes and modifications may be made thereto without departing from the scope of the invention.

I claim:

1. A deceleration control for an automotive type engine having an air throttle body with an air induction passage therethrough and a throttle valve mounted in the passage and variably movable between positions opening and closing the passage, including an air bypass passage connecting portions of the induction passage around the throttle valve for bypassing therethrough a portion of the total flow of air mass inducted into the induction passage, the throttle valve closed position defining a total air mass flow rate to the engine together with the air bypass flow rate establishing a set engine idle speed upon delivery of fuel to the engine for combination with the air mass flow, bypass valve means variably movable in the bypass passage to positions variably opening and closing the bypass passage to control the air mass flow rate therethrough, and means responsive to predetermined engine deceleration operating conditions upon movement of the throttle valve to the closed throttle position for momentarily moving the bypass valve means to an alternate position decreasing the rate of bypass air flow to an engine operating level lower than is required for normal engine idle operation, to decrease engine load and combustion torque for a smooth decelerating operation, the means responsive to engine deceleration also shutting off fuel delivery to the engine immediately subsequent to the attainment by the bypass valve of the lower air flow rate and thereafter returning the bypass valve means to the position establishing the set idle speed air flow rate prior to reestablishment of the fuel flow, with said means responsive to predetermined engine deceleration operating conditions moving the bypass valve to said alternate position in the event that the engine rpm is above a predetermined level, but with said means responsive to predetermined engine deceleration moving the bypass valve in a normal dashpot manner to decrease the air mass flow rate in response to movement of the throttle valve in response to the closed throttle valve position when the engine rpm is below a predetermined value.

2. A control as in claim 1, wherein the bypass valve is moved in a manner to track the movement of the throttle valve to normally increase/decrease the air flow rate of the bypass passage concurrent with the increase/decrease in the air flow rate past the throttle valve.

3. A control as in claim 2, wherein the bypass valve normally is moved at a rate similar to the rate of movement of the throttle valve.

4. A control as in claim 3, wherein the bypass valve is moved to the alternate position in a manner to close down the bypass passage to lower the engine load to a level lower than would normally be obtained at the same rpm level by normally smoothly closing the bypass valve at the beginning of closed-throttle decelerating.

5. A method of controlling the operation of an automotive type engine during predetermined engine decelerating operating conditions, the engine having an air induction passage with an air throttle valve movable therein to open or close the passage and an air bypass passage with an air bypass valve variably movable therein for variably bypassing air around the throttle valve to provide sufficient air to establish a set engine idle speed when the throttle valve is moved to a position closing the induction passage, and to supply air to the engine during open throttle valve conditions in addition to that supplied to the engine past the throttle valve, comprising the steps of:

placing the engine in an engine decelerating mode by releasing the throttle valve to the closed throttle position, in response to the presence of predetermined engine operating conditions, moving the bypass valve to reduce the bypass air mass flow rate to a level below that sufficient to maintain the engine at the set idle speed, terminating the fuel flow to the engine, returning the bypass valve to the set idle speed air flow rate level to reestablish the set engine idle speed condition upon resumption of flow of fuel to the engine, and normally maintaining the bypass valve open at predetermined positions with respect to the opened positions of the throttle valve during normal opening operation of the throttle valve and closing the bypass valve in a dashpot manner upon closing of the throttle valve during an engine deceleration condition when the engine rpm is less than a predetermined value, while moving the bypass valve to decrease the air mass flow rate through the bypass passage to the reduced level when the engine rpm is greater than the predetermined value when a deceleration operation is initiated.

* * * * *